Sept. 19, 1939.　　　　H. O. NELSON　　　　2,173,127
OVERHEAD LOGGING
Filed June 28, 1937　　　3 Sheets-Sheet 1

INVENTOR
HERMAN O. NELSON
BY
Cook & Robinson, ATTORNEY

Sept. 19, 1939. H. O. NELSON 2,173,127
OVERHEAD LOGGING
Filed June 28, 1937 3 Sheets-Sheet 2

INVENTOR
HERMAN O. NELSON
BY
Cook + Robinson ATTORNEY

Sept. 19, 1939.  H. O. NELSON  2,173,127
OVERHEAD LOGGING
Filed June 28, 1937   3 Sheets-Sheet 3
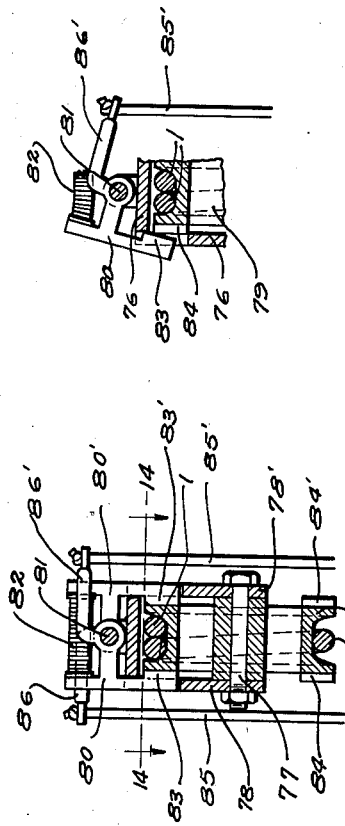
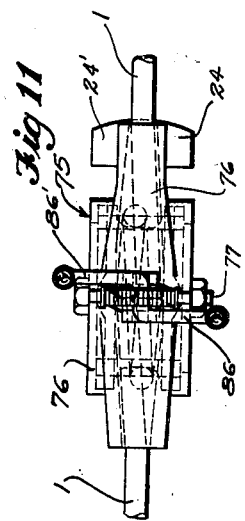
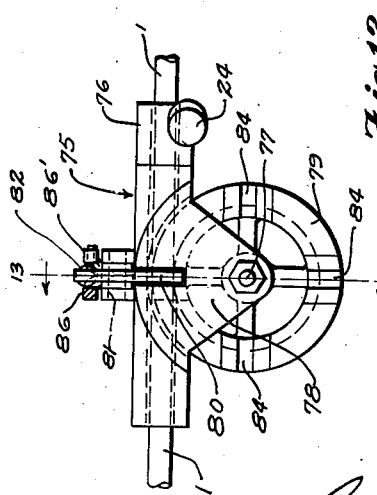
INVENTOR
HERMAN O. NELSON
BY
Cook & Robinson
ATTORNEY

Patented Sept. 19, 1939

2,173,127

UNITED STATES PATENT OFFICE 2,173,127

OVERHEAD LOGGING

Herman O. Nelson, Doty, Wash.

Application June 28, 1937, Serial No. 150,791

8 Claims. (Cl. 212—98)

This invention relates to improvements in overhead logging systems, and it has reference more particularly to overhead systems wherein a skidder carriage operates along a skyline, and wherein fallen logs are lifted to the carriage, and the latter then moved along the skyline to carry the log through the air, by means of a haul-in line, to a point of unloading.

It will here be stated, as matter explanatory to the invention and whereby to differentiate between the now common logging systems and the invention herein described, that in the most common types of overhead logging systems, the logs are yarded, or hauled in from the logging area to a central point, by means of a carriage traveling along a skyline cable that permits the logs to drag over the ground. The carriage is moved out along the skyline for loading by a haul-back line and is moved in for unloading by a haul-in line. In this dragging, much of the small, uncut timber which, if left standing, would in time replenish the timber land area plentifully, is destroyed.

Logging systems have been experimented with which contemplate carrying the logs above the ground over part of the distance of transportation, but these have been found impractical, especially on inclined sky lines, for the reason that the carriage movement is not controlled while the log is being lifted or lowered, and this results in the log being dragged over the ground.

Contrasted with what has gone before, the present system and equipment prevents the dragging of logs over the ground and the resultant destroying or damaging of small timber, so that the land may ordinarily bear timber naturally over a period of time. The present system also employs a haul-in line that not only suspends, but also elevates the log to and lowers it from the sky line carriage; the manner of suspension being such that paying out of the haul-in line will cause the suspended log to be lowered. It is apparent, however, that if using a free running carriage, on a length or stretch of skyline cable having an upward incline, the paying out of the haul-in line intended for lowering the log would permit, to a certain extent, the carriage to run back along the inclined cable, thus making it very difficult to land the log at any selected point.

It will further be stated that in view of the above mentioned objectionable feature of present-day systems, which is incident to the use of a free running skidder carriage on a skyline cable that is inclined either by reason of location of the spar trees or by reason of the deflection of the cable under heavy loads, it has been the principal object of this invention to overcome the objectionable and undesirable result, by the provision of a carriage for skyline travel, equipped with snubber locks designed to be actuated, by contact, to close and lock automatically with snubber blocks that may be set in the skyline at desired positions, thus to prevent any backrunning of the carriage along the cable when the haul in line is paid out for lowering the fall block either to unload or to pick up a log.

It is a still further object of the invention to equip the skyline carriage with additional means whereby the fall block may be held suspended directly from the carriage without pull on the haul-in line, and which means will be automatically released incident to the carriage becoming attached to a snubber block, thereby to permit the log suspended by the fall block, to be raised or lowered under control of the haul-in line.

It is also an object of the invention to provide snubber blocks that may be easily adjusted to and held or locked at different positions along the skyline cable, whereby to retain the carriage at any predetermined position for unloading as well as to provide for releasing the fall block for lowering at any desired location.

Another object of the invention resides in the provision of automatic means whereby the locking of the fall block with the carriage, from which the log is suspended, will automatically position the snubber lock wings for release of the carriage from the snubber blocks, and thereby permit its travel on the skyline.

It is also an object of this invention to provide a skyline logging carriage, operable by a minimum number of cables, and adapted to be stopped and held, by the snubber blocks, at any desired location, while the fall block is lowered or raised.

Still further objects of the invention reside in the details of construction and in the combination of parts embodied in the system, and in the mode of operation, as will hereinafter be fully described.

In accomplishing these and other objects of the invention, I have provided the improved details of construction, the preferred forms of which are illustrated in the accompanying drawings, wherein—

Figure 7:
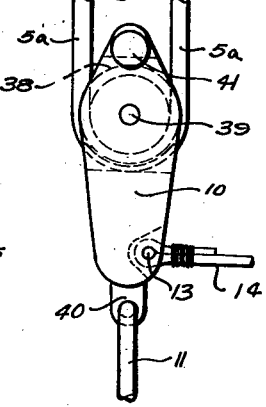
Figure 8:
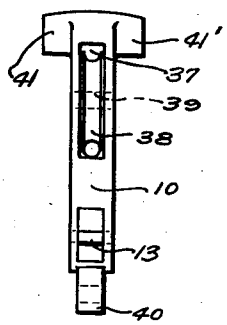

Figs. 7 and 8, respectively, are side and edge views of the fall block.

Figure 9:
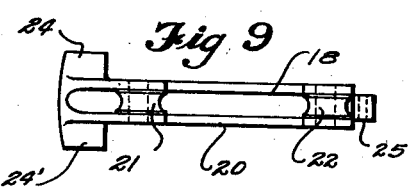
Figure 10:
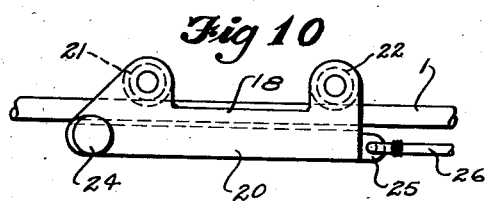

Figs. 9 and 10, respectively, are side and edge views of the inner snubber block.

Fig. 11 is a top, or plan view of the outer snubber block.

Fig. 12 is a side elevation of the same.

Fig. 13 is a cross section on the line 13—13 in Fig. 12.

Fig. 14 is a horizontal section on the line 14—14 in Fig. 12.

Fig. 15 is a detail view of one of the locking levers and pawls of the outer block.

Referring more in detail to the drawings—

Figure 1:
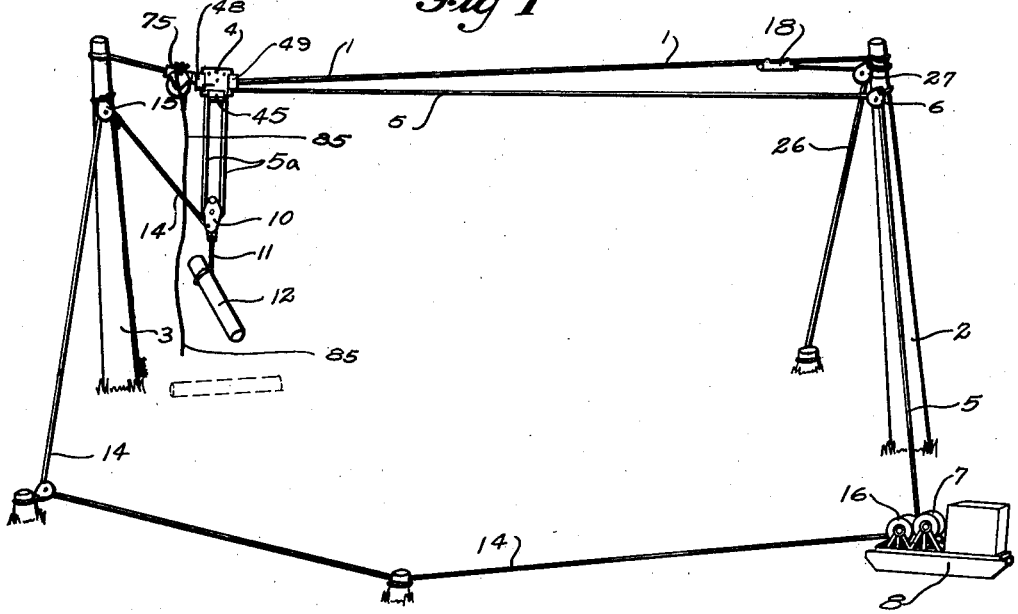
Fig. 1 is a view diagrammatically illustrating a logging system employing the present invention and showing the skyline skidder carriage as locked in position with the snubber block for picking up a log from the area being logged.
Figure 2:
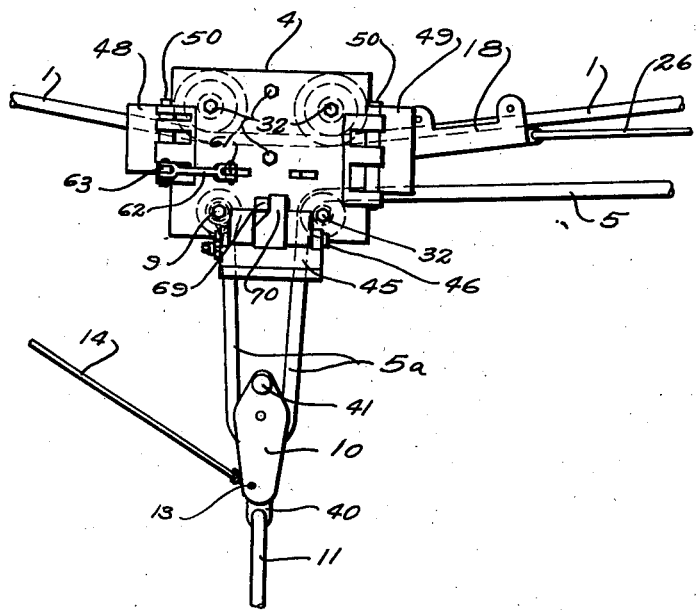
Fig. 2 is an enlarged side view of the carriage as locked in position with the snubber block for lowering the log at the unloading point.

In Figs. 1 and 2, 1 designates the skyline of an overhead logging system; this being dawn taut between the head and the tail spar trees, designated at 2 and 3, respectively. Mounted for travel along the skyline cable is the carriage 4 embodied by this invention, to which carriage a haul-in line 5 is attached; this line being extended from the winding drum 7 of a yarding engine 8 and in leading to the carriage is passed through a pulley block 6 attached to spar tree 2.

Figure 3:
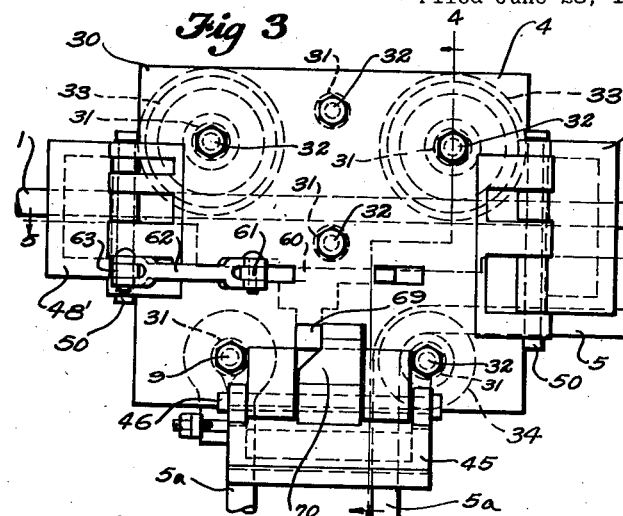
Fig. 3 is a side view of the carriage.

The haul-in line 5, as will be noted by reference to Figs. 1 and 3, has its outer end attached to the carriage 4 by a loop about a bolt 9. The cable also passes over a sheave 34 on the carriage and it depends from the bolt and sheave to form a loop, as at 5a, in which is suspended the fall block 10, and a choker cable 11 is attached to the fall block for connection with a log 12. It is also observed, by reference to Figs. 1 and 2, that a haul-back line 14 is attached by a pin 13 to the fall block 10, and is extended therefrom through a block 15 on the tail spar tree 3 and then through a series of other blocks advantageously located to a winding drum 16 on the yarding engine 8.

The mode of operation in this system as so far described, in general, comprises moving the carriage 4 out along the line 1 away from spar 2 by winding in the haul-back line 14 on the drum 16, while paying out the haul-in line 5 from the drum 7, thereby to locate the carriage in the vicinity of the log to be picked up; then lowering the fall block 10, by paying out the haul-in line 5 to a position permitting the securing of the choker cable 11 about a log to be moved. Then, by winding in the haul-line 5 while holding line 14, the fall block will be elevated and the log carried therewith to the skyline carriage. Then, with the block 10 locked to the carriage, as presently described, a continued winding-in of the haul-in line 5, and a similar paying out of the haul-back line 14 will cause the carriage, with the log suspended therefrom, to be moved along the skyline cable 1 to the point of unloading.

In order that the log may be lowered accurately at any selected location, and also in order that the carriage may be prevented from running back along the skyline when the haul-in line is slackened by reason of cable deflection or any upward inclination of the skyline, I have provided the carriage with what will be referred to as snubber locks, which are adapted to lock with snubber blocks that may be positioned on the skyline cable respectively at the location for loading and unloading of the transported logs.

The snubber blocks are illustrated in Figs. 1 and 2, and are designated by numerals 18 and 75. Block 18 is shown in detail in Figs. 9 and 10, and block 75 in Figs. 11, 12, 13 and 14. The inner snubber block 18 comprises a heavy bar, or frame 20 equipped near its opposite ends at the top side of the bar with flanged wheels 21 and 22 adapted for travel on the skyline cable 1. The bar also is longitudinally channeled along its top side beneath the flanged wheels for passage of the skyline cable 1 whereby it is suspended. At its inner end, that being the end to be engaged by and locked with the skyline carriage, the snubber block 18 has aligned lugs 24—24' projecting from its opposite sides for locking with the carriage, and, at its outer end, has an ear 25 to which the block adjusting cable 26 is connected. The cable 26 used with this snubber block is passed through a pulley block 27 fixed to the spar tree 2, and is then extended down along the spar and may be suitably anchored. It is of such length that it may be paid out or drawn in as is required to adjust the block 18 to a desired unloading location along the skyline; it being understood that this snubber block will run out on the skyline by its own weight, by reason of the downward inclination of the skyline cable 1 under weight of the carriage, or hillside slope. It may also be pulled, if locked to the skyline carriage, to any desired position by the haul-in line or haul-back line, as presently described.

The outer snubber block 75, as shown in Figs. 11 to 14, is of slightly different construction from block 18 and is adapted to be moved along the cable to various locations for loading. It is understood that the loading positions may extend along the entire area spanned by the sky-line, while the unloading position will at all times be closely adjacent to the spar tree 2.

The outer snubber block 75 consists of a frame 76 having a bore or channel therethrough to accommodate the passage of the skyline cable 1. At its inner end, it is provided with the aligned lugs 24—24' projecting from its opposite sides for locking with the carriage.

Suspended by a pin, or bolt, 77, through downwardly depending flanges 78—78', is a sheave wheel 79 about which the skyline is looped, as illustrated in Fig. 11. The weight of the cable and the additional weight of the carriage holds the cable taut around the sheave so that it grips it tightly. When this snubber block is moved along the cable, it is evident that the sheave 79 must rotate, and that it will be held against movement if the sheave is held. Therefore, in order to lock the snubber block in a desired position, I have provided locking levers as in Fig. 14. These levers comprise vertical portions 80—80' disposed respectively with their lower ends at the opposite sides of the top edge of a sheave wheel 79, which wheel has radial slots 84—84' designed to receive pawls 83—83' on the ends of the levers to lock the wheel against rotation. The upper ends of the levers extend above the pivot shaft 81 and an expansion spring 82 is located between them to yieldingly hold the pawls in locking engagement within the wheel. These levers 80—80' have four horizontal arms, 86'—86 respectively extended to the opposite sides of the block 76, as seen best in Fig. 13. Thus, by means of a rope 85 having ends attached to the levers 86—86', the pawls 83—83' may be moved outwardly against the action of the spring 82, to a position free of the slots or recesses 84—84' in sheave wheel 79 so that the snubber block is free to be moved.

To move this snubber block 75, the carriage is locked thereto and the rope 85 pulled downwardly by a member of the logging crew, to unlock the sheave 79 for turning, and then, the carriage is moved to the desired location, and the snubber again locked in position.

The skyline carriage 4 comprises opposite face plates 30—30' of rectangular form and joined rigidly in spaced relation by tubular spacing sleeves 31 and bolts 32 which pass through the plates and sleeves. Mounted between the plates, in the upper part of the block, and in horizontal alignment, are the carriage supporting sheave wheels 33—33' adapted for travel on the skyline cable 1. Directly below the wheel 33' is a smaller wheel 34, over which the haul-in line 5 passes in forming the loop 5a in which the fall block 10 is suspended; it being noted in Fig. 3 that the cable 5 is secured at its outer end to a bolt 9 that extends through a spacing sleeve 31 between the side walls of the carriage.

The fall block 10 comprises a vertical bar having a through recess 37 in its upper end portion in which a sheave 38 is located to revolve on its mounting pin 39; it being noted that the loop 5a of the cable 5 passes about the sheave 38 and that the bar hangs vertically. At the lower end of the bar is an ear 40 in which the choker cable 11 is connected, and at its upper end the block has aligned lugs 41—41' projecting from its opposite sides for locking with the carriage, as will presently be described.

Hingedly attached to the opposite side plates of the carriage, centrally and at the lower edges thereof, are the fall block locking wings 45—45' mounted by hinge pins 46—46'. These wings are so balanced that they will open apart by their own weight, as seen in full lines in Fig. 4, and they have inwardly extending shoulders 45a so disposed as to be engaged by the aligned lugs 41—41' on the upper end of the fall block 10 between them, to close the wings together, as in Fig. 6, thereby and retain the block locked with the carriage. It will be understood, by reference to Figs. 4 and 6 that these wings are recessed in their inner faces as at 45b, and when closed together, the recesses receive the lugs 41—41' therein, and thereby hold the block 10 suspended.

Figure 4:
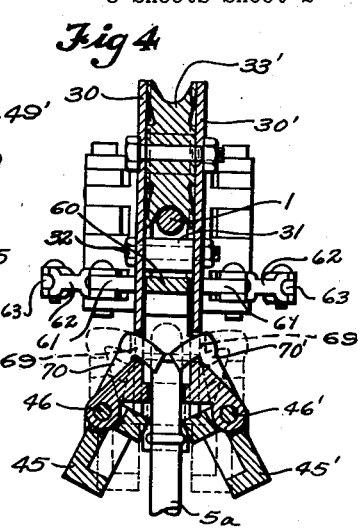
Fig. 4 is a vertical section on line 4—4 in Fig. 3, showing the fall block locking wings open for receiving the fall block.

It will be explained also that when the wings are in open position, as in Fig. 4, they may be closed together automatically over the fall block lugs by bringing the fall block upwardly in a manner to cause the lugs to engage against the shoulders 45a at the top of the recess. Since the pivot points of the wings are laterally of the points of contact, this causes the wings to close together. These wings 45—45', closed as just described, will be locked in this closed position incident to a certain movement of locking wings on the opposite ends of the carriage, presently described, that occurs as the carriage is pulled away from the snubber block.

At the opposite ends of the carriage 4 are the previously mentioned snubber block locking wings 48—48' and 49—49', mounted by vertical hinge pins 50. The skyline cable 1, in its passage through the carriage, passes between the paired wings on each end thereof, and the wings are adapted, when opened apart, to receive the aligned lugs 24—24' on the ends of the snubber blocks between them.

Figure 5:
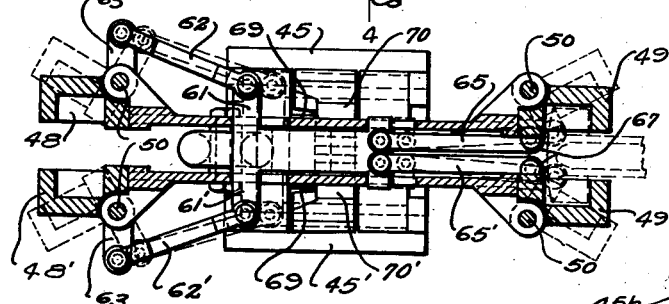
Fig. 5 is a horizontal section on line 5—5 in Fig. 3, showing respectively, in full and in dotted lines, the locking wings at the ends of the carriage in closed and in open positions.

It will be understood, by reference to Fig. 5, that the wings have inwardly opening recesses in their inner surfaces and that with the wings in an open position, as during the travel of the carriage along the skyline cable 1, they will be closed by coming in contact with the snubber block. Also, they will be locked in a closed position over the lugs 24—24' of the blocks, by the lowering of the fall block 10.

It will be explained that the closing of the snubber block wings over the lugs 24—24' on a snubber block is caused by these lugs coming in contact with the inner edges of the recess in the open wings; the closing of these snubber block wings permits the fall block wings to open. Upon the opening of the fall block wings permitting the subsequent lowering of the fall block, the snubber block wings are locked in their closed position and remain so locked until the fall block is again raised.

A feature of the invention resides in the devices whereby the wings at each end of the carriage are connected with a slide block 60 mounted for horizontal sliding action between the face plates 30—30' of the carriage. At one end of the slide block are outwardly extending arms 61—61' connected respectively by links 62—62' with lever arms 63 which extend outwardly from the locking wings 48—48' at that end of the carriage. At the other end of the slide, the links 65 are pivotally connected thereto and extended to pivotal connection with the lever arms 67 which extend inwardly from the wings 49—49' at that end of the carriage.

When the wings on either end are in open position, they may be automatically closed and locked over the snubber block lugs incident to that travel of the carriage which causes the inner wall of the wing recesses to be engaged by the lugs 24—24' of the snubber block.

Figure 6:
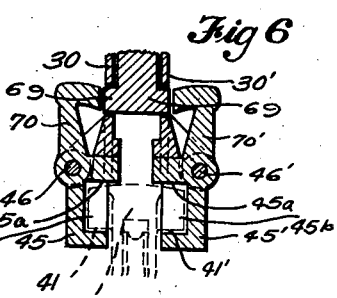
Fig. 6 is a vertical section through the fall block locking wings, showing them in a closed position and locked as for retaining the fall block.

Also, it is a feature of the invention that when the snubber wings are in open position, the wings 45—45' which lock with the fall block are held against being opened apart. This is by reason of the fact that the slide block has a downwardly projecting arm 69 which, when the snubber locking wings are in open position, is disposed in a position at which it will be engaged by lever arms 70 on the lower or fall block locking wings, thus to hold the wings closed, as in Fig. 6. However, when the snubber wings are actuated to closed position, this block lug 69 will, by reason of the connection links 62, be moved out of the way of the lever arms 70 and the distribution of the weight of the fall block wings will cause them to swing automatically to open position and allow the fall block to be lowered. It will also be explained here that upon the opening of the fall block wings, subsequent to the closing of the snubber block wings, the lever arms 70 swing inwardly, as shown in Fig. 4, in such a position as to be engaged by arm 69, and thus prevent return movement of the slide 60. This locks the snubber block wings in closed position from which they cannot be opened until the fall block has been raised into engagement with its locking wings on the carriage. When it is so raised, the lever arms 70 are swung outwardly, as shown in Fig. 6, and a movement of the carriage in a direction away from the snubber block will pull these snubber block wings apart in the same manner that they were closed.

Assuming that the system is arranged as illustrated herein, and that the carriage and the various parts associated therewith are in accordance with the previous description, it will be understood that if it is desired to move the log 12 from the position shown in dotted lines in Fig. 1, to a position for unloading adjacent the spar tree 2, the operator would first locate the outer snubber block 75, as previously explained, over the logs to be transported, and then set the inner snubber block 18 over the unloading position; then, by paying out the haul-in line 5 and winding in the haul-back line 14, respectively, on drums 7 and 16, the carriage would be brought into contact with the snubber block 75 at the loading position, thus to cause the carriage to lock therewith. The fall block would then be lowered by its own weight by a continued pay-out of the haul-in cable 5, to a convenient position for connecting the choker line 11 with the log 12, and thereafter, the haul-in line 5 would be wound in on the drum 7 to bring the fall block up and to cause it to lock with the carriage. As the fall block locks with the carriage, it effects the release of the connection with the snubber block 75 and a continued winding in of the haul-in line 5 and a paying out of the haul-back line 14 moves the carriage toward the unloading position, and finally brings it against the snubber block 18 at that position, causing the carriage to lock with the snubber block 18. As previously explained, this unlocks or releases the fall block from the carriage. Thereupon, the reversing or unwinding of the cable 5 effects the lowering of the fall block and log to unloading position. After the log has been disconnected, the cable 5 is wound in on the drum, thereby bringing the fall block up against the carriage and effecting locking of the fall block with the carriage and the unlocking of the snubber wings for the outward travel of the carriage back again to the loading position.

Having thus described my invention, what I claim as new therein and desire to secure by Letters Patent is—

1. In an overhead logging system, a skyline, a carriage mounted for travel thereon, snubber blocks including means whereby they may be set on the skyline at selected loading and unloading locations, a haul-back line for the carriage, a haul-in line connected with the carriage and providing a running drop line depending therefrom, a fall block attached to the drop line to be lifted to the carriage thereby, devices on the carriage adapted for automatic locking connection with the snubber blocks by contact, other devices on the carriage for automatic locking connection with the fall block when the latter is lifted thereagainst, a lock slide movably mounted in the carriage, linkage connecting the said slide with the first mentioned devices to move the slide to different positions with the locking and releasing actions thereof, and adapted, when the first devices are released from a snubber block, to lock the devices which support the fall block against release therefrom; said fall block locking devices being adapted when in released position, to engage with the said slide to hold it against movement and thereby, through the said linkage, to retain the snubber locking devices against release movement.

2. A device as in claim 1 wherein the locking devices comprise hingedly mounted, shouldered wings, adapted to be actuated from released to locked connection with those parts with which they are intended to lock by causing the part to come into actuating contact with said wing shoulders.

3. In an overhead logging system, a skyline, a carriage mounted for travel therealong, snubber blocks mounted for travel on the skyline, means for moving the snubber blocks to different locations on the cable for loading and unloading and for holding them at selected positions, a haul-in line attached to the carriage and forming a running drop line depending therefrom, a fall block attached to said drop line, a haul-back line attached to the block, lugs on the snubber blocks, a pair of locking wings at each end of the carriage adapted to be moved from released to locked relation with the lugs of the snubber blocks by being moved into contact therewith, thereby to hold the carriage against back run on the cable, another pair of locking wings on the carriage for engaging the fall block to hold it suspended, and means connecting the latter wings with the first mentioned wings whereby locking of the latter releases the former, from connection with a snubber block.

4. An overhead logging system comprising a skyline, a carriage mounted for travel thereon, snubber blocks mounted on the line, means for moving them to locations for loading and unloading and for holding them at selected locations, a haul-in line attached to the carriage and forming a running drop line depending therefrom, a fall block attached by the drop line and adapted to be lifted to the carriage thereby, lugs on the snubber blocks and on the fall block, locking wings on the carriage ends adapted to be actuated from released to locked relation with the lugs of the snubber blocks by contact therewith, locking wings on the base of the carriage for automatic locking over the lugs of the fall block by contact to support the latter, a locking slide mounted in the carriage, linkage connecting the slide and wings on the carriage ends whereby the slide moves with the opening of said wings to a position at which it will hold the latter mentioned wings in locked position, and moves to a position held against movement by the fall block supporting wings when they are open to prevent opening action of the snubber block locking wings.

5. A device as in claim 4 wherein the paired locking wings are arranged to open apart and close toward each other and have recessed inner faces to receive the lugs on the parts with which they are to lock and formed with shoulders against which the lugs may be brought into abutment to effect the locking action of the wings.

6. In an overhead logging system, a skyline, a carriage mounted for travel therealong, a snubber block on the skyline with which the carriage may be locked; said block comprising a frame with a sheave therein about which the skyline is extended, and a releasable means on the frame for holding the sheave against rotation, thereby to hold the block against travel on the skyline.

7. A device as in claim 6 wherein the sheave locking devices are yieldingly held in locking position, and cables depend therefrom for their actuation to released position.

8. A device as in claim 6 wherein the snubber block and carriage have releasable connecting means and a haul-in line and a haul-back line having operative connections with the carriage for moving the latter along the skyline, thereby to move the snubber block to selected positions.

HERMAN O. NELSON.